UNITED STATES PATENT OFFICE.

HANS TOEPFER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

PROCESS OF DYEING.

No. 12,826. Specification of Reissued Letters Patent. Reissued July 7, 1908.

Original No. 873,696, dated December 10, 1907, Serial No. 327,552. Application for reissue filed March 7, 1908. Serial No. 419,825.

*To all whom it may concern:*

Be it known that I, HANS TOEPFER, a citizen of the German Empire, residing at Elberfeld, Germany, Kingdom of Prussia, have invented new and useful Improvements in Processes of Dyeing, of which the following is a specification.

As is known, the sulfur dyestuffs show the disadvantage of dyeing uneven shades.

I have now discovered a new process for dyeing the vegetable fiber with sulfur-coloring matters which process avoids in a very simple manner the above-mentioned disadvantage.

The new process consists in carrying out the dyeing of the vegetable fiber with sulfur dyes in baths containing the usual alkaline sulfids with the addition of ammonium salts. The favorable action of these compounds seems to be due to the fact that the ammonium salts neutralize the free alkali present in the dyebaths containing sulfids of alkalies. Level and uniform shades are thus produced. It is worthy of note that in many cases the shades are deeper and faster to washing than those obtained without the employment of ammonium salts. An addition of soap, especially soft soap, is often advantageous.

The new process is also adapted for machine dyeing.

The following example may illustrate my invention, the parts being by weight: A dyebath is prepared from 2000 parts of water, 15 parts of Katigen indigo B extra, 30 parts of crystallized sulfid of sodium, 8 parts of calcined sodium carbonate, 40 parts of Glauber's salt, and 4 parts of soft soap. To this dyebath, heated to 30 degrees C., 3 parts of ammonium carbonate are added. The bath at once assumes the yellow color of the vat. 100 parts of cotton yarn are then dyed in this bath at 30 degrees C. for one hour, taking care that the material is always covered by the liquid. The dyed goods are squeezed out, exposed to the air, and well rinsed.

Ammonium carbonate can be replaced by other ammonium salts, such as ammonium chlorid, ammonium sulfate, etc. The dyeing can also be done at a higher temperature or at the ordinary temperature. On account of the volatility of ammonium sulfid formed in the bath it is advantageous to dye at a moderate temperature. Of course, other sulfur dyestuffs may be used.

Having now described my invention and in what manner the same is to be performed, what I claim, is:

The herein described process for dyeing vegetable fibers with sulfur dyes, which process consists in dyeing vegetable fiber in a dyebath containing sulfur dyes, alkaline sulfids and ammonium salts, substantially as described.

In testimony whereof I have hereunto set my hand in the presence of two subscribing witnesses.

HANS TOEPFER. [L. S.]

Witnesses:

OTTO KÖNIG,

WM. WASHINGTON BRUNSWICK.